(12) United States Patent
Fredin et al.

(10) Patent No.: US 7,261,320 B2
(45) Date of Patent: Aug. 28, 2007

(54) AIRBAG CUSHION WITH DUAL MODE DEPLOYMENT FOR PRE-IMPACT AND IMPACT CONDITIONS

(75) Inventors: Steven R. Fredin, Ortonville, MI (US); Bradley W. Smith, Ogden, UT (US); David W. Parkinson, North Ogden, UT (US); Earl H. Nelson, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 177 days.

(21) Appl. No.: 11/087,173

(22) Filed: Mar. 23, 2005

(65) Prior Publication Data

US 2006/0214398 A1 Sep. 28, 2006

(51) Int. Cl.
*B60R 21/16* (2006.01)

(52) U.S. Cl. .................. 280/743.2; 280/735; 280/736; 280/742

(58) Field of Classification Search ................. 280/736, 280/742, 743.2, 734, 735
See application file for complete search history.

(56) References Cited

U.S. PATENT DOCUMENTS

| | | | | |
|---|---|---|---|---|
| 5,887,894 A | * | 3/1999 | Castagner et al. ....... | 280/743.2 |
| 6,076,854 A | * | 6/2000 | Schenck et al. .......... | 280/743.2 |
| 6,299,203 B1 | * | 10/2001 | Muller ....................... | 280/736 |
| 6,513,835 B2 | * | 2/2003 | Thomas .................... | 280/743.2 |
| 6,581,964 B2 | * | 6/2003 | Braunschadel ........... | 280/743.2 |
| 6,616,184 B2 | * | 9/2003 | Fischer ..................... | 280/743.2 |
| 6,918,614 B2 | * | 7/2005 | Ryan ........................ | 280/743.2 |
| 7,021,657 B2 | * | 4/2006 | Kassman et al. ......... | 280/43.2 |
| 2005/0057030 A1 | * | 3/2005 | Fischer et al. ........... | 280/743.2 |
| 2005/0161922 A1 | * | 7/2005 | Bilbrey et al. ............. | 280/736 |

* cited by examiner

*Primary Examiner*—Ruth Ilan
(74) *Attorney, Agent, or Firm*—Sally J Brown; Stoel Rives LLP (57) ABSTRACT

An airbag restrain system is disclosed for use in automotive protective systems. The airbag restraint system includes an inflatable airbag cushion having a tether coupled to the interior surface of the cushion. The airbag restraint system further includes first and second inflators for dual mode airbag cushion deployment. Upon a pre-impact condition, the first inflator deploys to partially inflate the cushion and release the tether. The second inflator also deploys to inflate the cushion to approximately full capacity. Upon an impact condition, only the second inflator deploys and the tether extends until taut to limit expansion of the cushion. Means are provided to retain and release the tether in response to the first inflator.

43 Claims, 7 Drawing Sheets

AIRBAG CUSHION WITH DUAL MODE DEPLOYMENT FOR PRE-IMPACT AND IMPACT CONDITIONS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, the airbag cushion inflates and deploys through a cosmetic cover. The airbag cushion deploys towards the occupant and provides a restraint. Pre-impact sensing of a vehicle collision offers a greater time period to activate an airbag restraint system and absorb or distribute the occupant's kinetic energy. A sensing system must be highly reliable when triggering deployment of a non-reversible airbag cushion. In the event that the pre-impact sensing system does not respond as designed or is deactivated, a traditional airbag restraint system response is necessary. Thus, it would be advantageous to provide an airbag restraint system with the capability to deploy in one mode by initiation of pre-impact sensors and in another mode by initiation of conventional impact sensors.

Embodiments described below provide an airbag restraint system which functions for both pre-impact sensing and traditional impact sensing. In a pre-impact mode, the airbag restraint system deploys a larger airbag with greater gas quantity and a less aggressive fill rate. The pre-impact mode offers improved occupant performance by optimizing the energy absorption over an entire ride down period. The pre-impact airbag is designed to fill the space between the occupant and the interior, prior to any occupant displacement, in such a manner that poses no risk to out-of-position occupants. The airbag restraint system may further function in an impact mode by deploying a smaller airbag cushion with less gas quantity and a faster filling time.

Although the benefits of a pre-impact airbag deployment are evident, the industry is slow to utilize such systems over concern for false deployments, i.e., situations where pre-impact sensors incorrectly predict that an impact is unavoidable. Providing pre-impact sensors that are sensitive enough to predict impacts without having false initiations is extremely difficult. Desensitizing pre-impact sensors could allow some impacts to be undetected. Accordingly, a restraint system is desired that provides less sensitive pre-impact detection for reliable detection of most impacts and also provides a backup impact detection for impacts missed by the pre-impact detection.

Figure 1A:
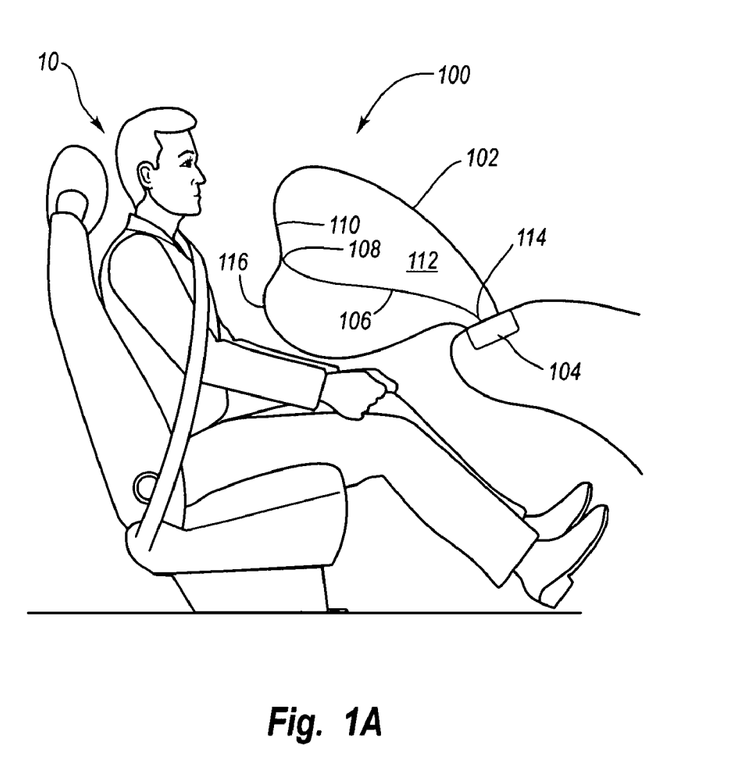
FIG. 1A is a cross-sectional view of an embodiment of a deploying airbag.

With reference now to the accompanying figures, particular embodiments of the invention will now be described in greater detail. FIG. 1A depicts an airbag restraint system 100 that includes an airbag cushion 102 deploying from a housing 104 in an impact mode. A cross-sectional view of the airbag cushion 102 is shown relative to an occupant 10 who has not yet impacted the airbag cushion 102. In this mode, the airbag cushion 102 is deployed when impact sensors detect an actual impact. The airbag cushion 102 is aggressively deployed due to the short time duration until occupant impact.

The airbag cushion 102 includes a tether 106 that is coupled at a distal end 108 to an interior surface 110 of the cushion 102. The distal end 108 may be coupled by stitches, adhesives, forms of bonding, and the like. In this embodiment, the tether 106 is completely or mostly disposed within the interior 112 of the cushion 102. The tether 106 may be formed of nylon fabric or any other suitable material known in the art. The tether 106 is coupled at a proximal end 114 to a fixed location (not shown) within the housing 104. The coupling of the proximal end 114 may be performed in various ways and will be discussed further below. The tether 106 is sized and coupled appropriately so that the tether 106 pulls tight during deployment and restricts the expansion of the cushion 102. As can be appreciated the amount of restriction may be varied based on design. By way of illustration, a 180 volumetric liter cushion may be restricted to 120 volumetric liters with the use of a tether 106.

Although a single tether 106 is depicted, in alternative embodiments, a plurality of tethers 106 may be used to restrict the cushion expansion and limit the internal volume. Such tethers 106 may be disposed to ensure a symmetrical limitation of cushion expansion. In an alternative embodiment, one or more tethers 106 may also be coupled to an exterior surface 116 of the cushion 102 and be disposed completely or mostly outside of the cushion. The tether(s) 106 may be coupled at a proximal end to the housing 104 or to a position adjacent the housing 104.

Figure 1B:
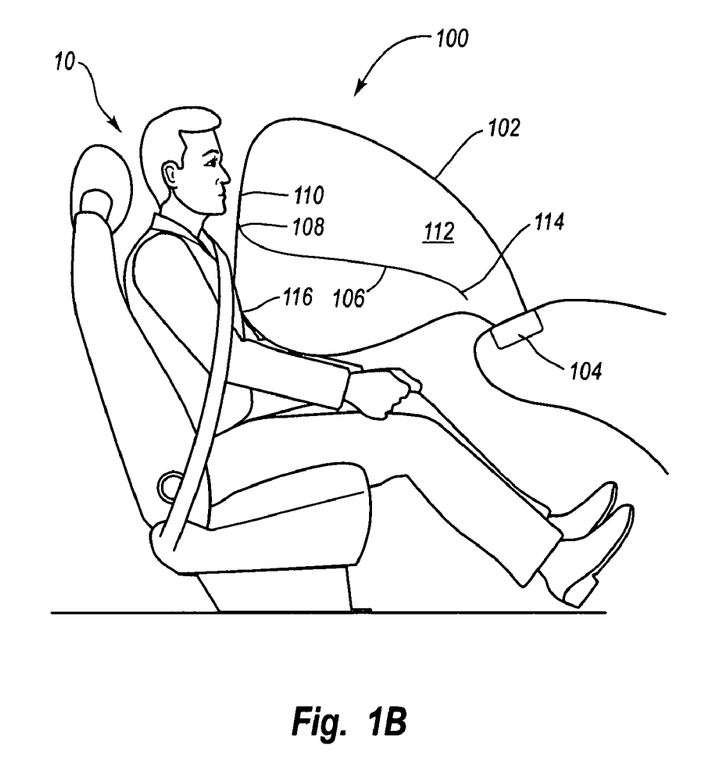
FIG. 1B is a cross-sectional view of an embodiment of a deploying airbag.

Referring to FIG. 1B, the airbag restraint system 100 of FIG. 1A is shown deploying in a pre-impact mode. In a pre-impact mode, deployment is initiated by pre-impact sensors and the airbag cushion 102 is allowed to expand to full capacity. The tether 106 is disengaged at its proximal end 114 from the housing 104 or from a position adjacent the housing 104. Disengagement of the proximal end 114 may be accomplished in various ways as will be discussed below. In order to expand to full capacity, the airbag cushion 102 requires additional gas as will be discussed subsequently.

In a pre-impact mode, the cushion impact with the occupant 10 occurs sooner and the impact energy is managed over a longer time interval. Longer loading time is beneficial because the impact energy has a lower overall peak load on the occupant, thus reducing potential for injuries. A larger airbag cushion 102 also provides for better coverage area and reduces the potential for contact between the occupant 10 and the vehicle's interior. Furthermore, due to the greater available time to fill the airbag cushion 102, a slower, less aggressive fill rate can be used to fill the airbag cushion 102. This greatly reduces the potential for injury to occupants that may be out-of-position and in the path of a deploying airbag cushion. An out-of-position occupant may be one who is sitting too far forward and is in the path of a deploying airbag cushion.

Figure 2:
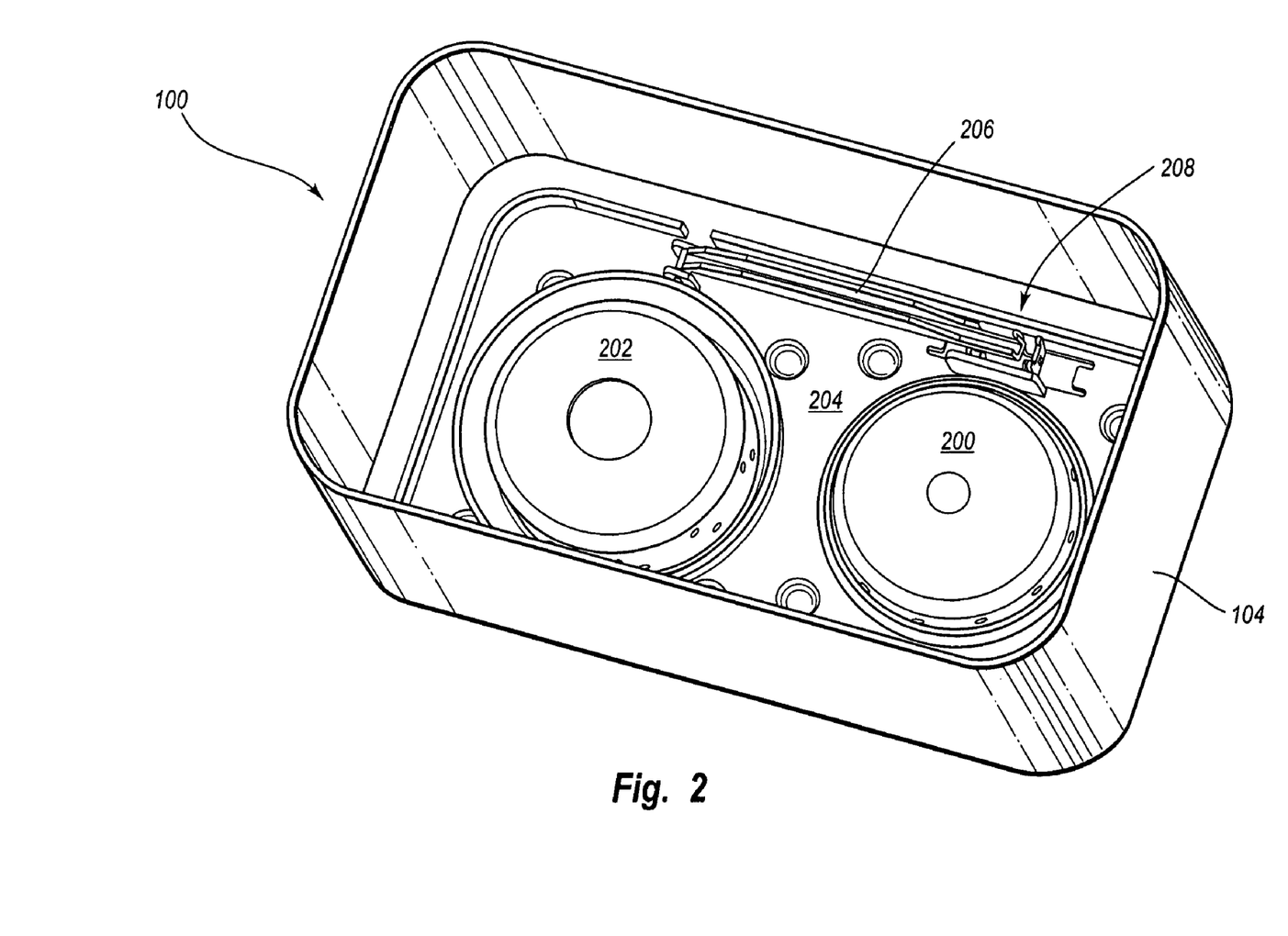
FIG. 2 is a perspective view of an interior of an airbag module.

Referring to FIG. 2, a perspective view of the interior of the housing 104 and additional components of the airbag restraint system 100 are shown. The system 100 includes first and second inflators 200, 202 that are secured within the housing 104. The inflators 200, 202 may be secured to a base 204 of the housing 104 as shown. In one embodiment, the system 100 may further include a rod 206 to which the proximal end 114 of the tether 106 couples. The proximal end 114 may include a loop 207 that engages the rod 206. The system 100 also includes a lock device 208 that retains the position of the rod 206. The latch device 208 further serves to disengage the coupling between the proximal end 114 and the rod 206. The lock device 208 is discussed in further detail in reference to FIG. 3.

In pre-impact mode, the first and second inflators 200, 202 are both deployed sequentially, with the first inflator 200 being deployed first. The first inflator 200 generates exhaust gas that causes initial inflation of the airbag cushion 102 and also activates the lock device 208. By activating the lock device 208, the tether 106 is disengaged from the rod 206 and the airbag cushion 102 is able to expand to full inflation.

In impact mode, only the second inflator 202 is deployed. The tether 106 is not released, the airbag cushion 102 has limited expansion, and the fill time is shorter. The second inflator 202 is all that is required to fill the airbag cushion 102 to its limited capacity. This deployment is similar to that experienced with conventional airbag restraint systems. The second inflator 202 is spaced further from the lock device 208 to reduce the likelihood that exhaust gas will activate the lock device 208. A baffle 210 may also be disposed at least partially around the second inflator 202 to direct exhaust gas away from the lock device 208. Deployment of the second inflator 202 does not direct sufficient force against the lock device 208 to release the tether 106.

Figure 3:
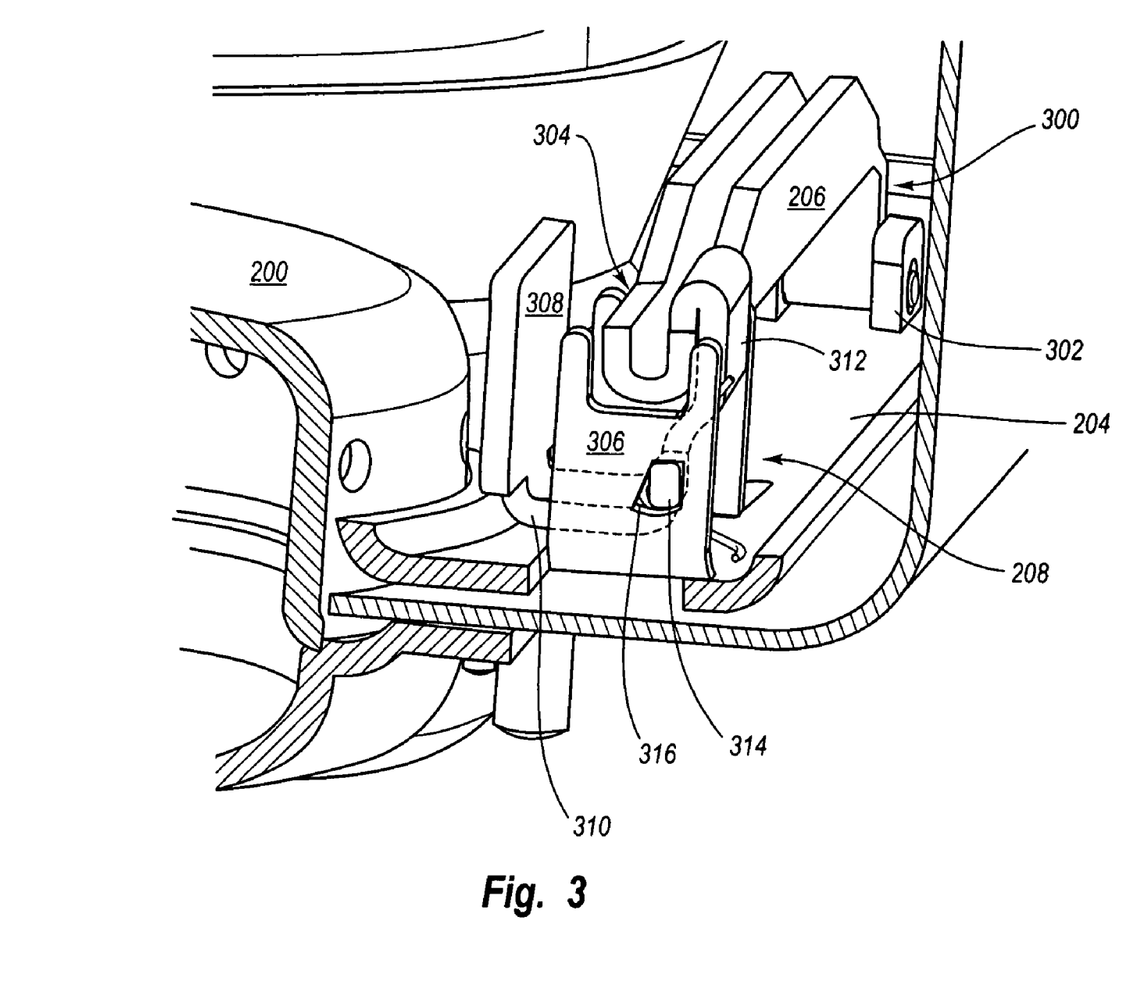
FIG. 3 is a perspective view of a portion of the interior of the airbag module of FIG. 2.

Referring to FIG. 3, a perspective view is shown of the rod 206 and the lock device 208. The rod 206 may be pivotally coupled at a first end 300 to a bracket 302 that is secured to the base 204. The rod 206 may be configured to pivot vertically, as shown, horizontally, or in any other manner. The second end 304 may rest on or partially nest within a support bracket 306 that is also secured to the base 204. The lock device 208 includes a plate member 308 that is vertically disposed adjacent the first inflator 200. The plate member 308 receives the impact of the exhaust gas from the first inflator 200. The lock device 208 includes an arm 310 that extends from the plate member 308 and couples to a clip member 312. The clip member 312 engages the second end 304 and retains the rod 206 in a fixed position for tether retention. A pair of opposing flanges 314 may be disposed on and extend from the arm 310. The flanges 314 each respectfully engage opposing apertures 316 in the support bracket 306. The lock device 208 secures the rod 206 in a fixed position and retains a tether 106 that may be looped around the rod 206.

Figure 4A:
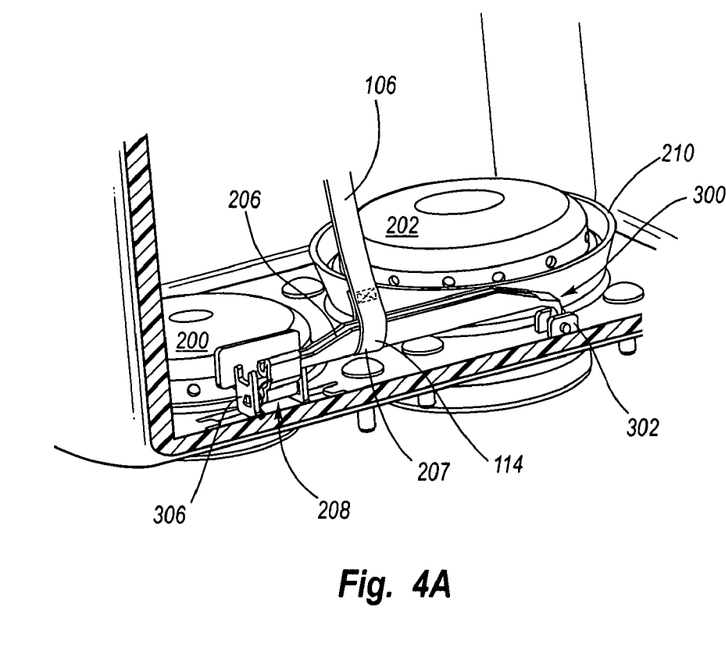
FIG. 4A is another perspective view of the interior of the airbag module of FIG. 2.

Referring to FIG. 4A, a perspective view of the rod 206 is shown in a fixed position and disposed relative to the first and second inflators 200, 202. Secured in this manner, the rod 206 retains the tether 106 prior to deployment. The rod 206 further retains the tether 106 during impact mode and thereby prevents the airbag cushion 102 from fully expanding.

Figure 4B:
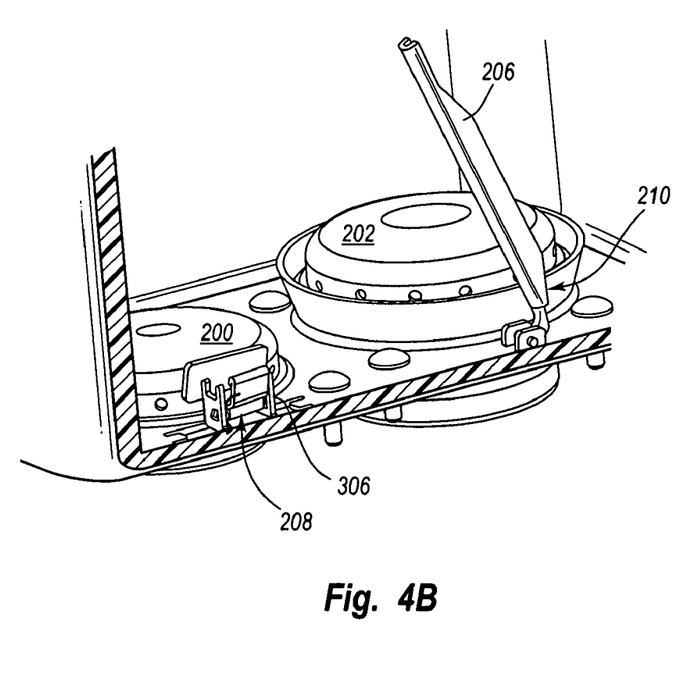
FIG. 4B is another perspective view of the interior of the airbag module of FIG. 2.

Referring to FIG. 4B, a perspective view of the rod 206 is shown in a release position. The release position only occurs upon pre-impact detection by pre-impact sensors. The first inflator 200 is deployed which vents exhaust gas against the plate member 308. This causes the lock device 208 to pivot sufficient to disengage the clip member 312 from its position of retention against the rod 206. The rod 206 is disengaged at its second end 304 and pivots freely about its first end 300. As the airbag cushion 102 expands, the tether 106 is tightened and the proximal end 114 readily slips off the rod 206. The airbag cushion 102 is able to expand to its full capacity. After deployment of the first inflator 200, the second inflator 202 is deployed to provide additional exhaust gas to fill the airbag cushion 102. Deployment of the second inflator 202 may occur approximately after the first inflator 200 is expended or may occur prior to that time.

The illustrated embodiment of the rod 206 and lock device 208 is one example of a technique to retain and release a tether 106 for dual mode deployment. As can be appreciated, various devices may be utilized to effect the retention and timely release of a tether 106. Such devices may include mechanical, electromechanical, and electromagnetic components to achieve the same function and are included within the scope of the invention.

Figure 5:
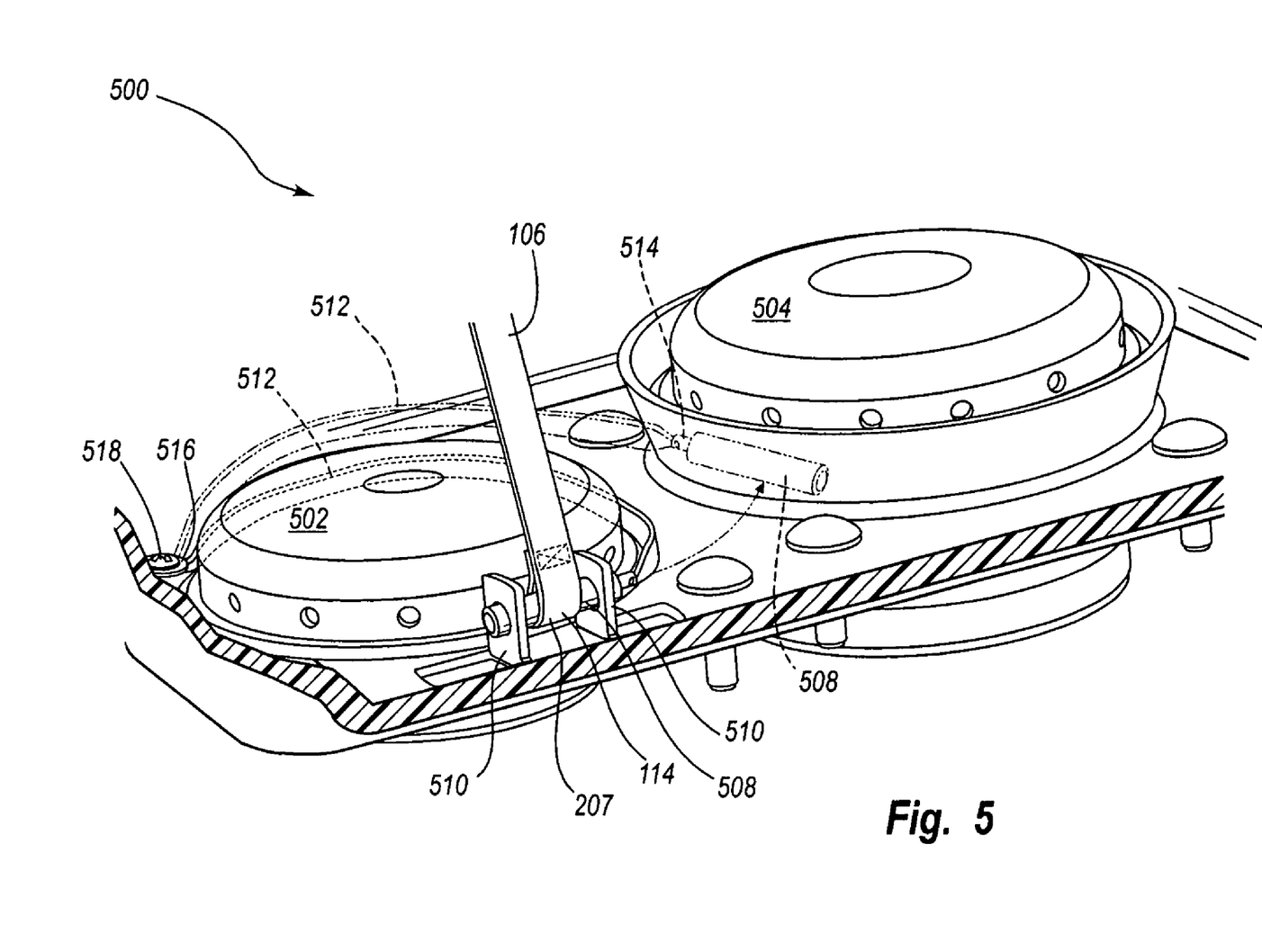
FIG. 5 is a plan view of an alternative embodiment of an airbag module.

Referring to FIG. 5, an alternative embodiment of a portion of an airbag retention system 500 is shown. The system 500 is similar to that previously discussed above in that first and second inflators are used 502, 504 to provide inflation for pre-impact and impact modes. The inflators 502, 504 are at least partially housed within a housing 506. A rod 508 is secured to the housing 506 by two or more retainers 510. Each retainer 510 is coupled to the housing 506 and formed so as to allow the rod 508 to pass between the retainer 510 and the housing 506. Retainers 510 may be coupled to the housing 506 by bolts, rivets, welds, or other techniques known in the art. The proximal end 114 of a tether 106 loops around the rod 508 at a position between the retainers 510. In this manner, the tether 106 is secured to the rod 508.

The rod 508 is coupled to a band 512 that at least partially extends around the first inflator 502. The rod 508 retains its position within the retainers 510 by frictional engagement and through coupling with the band 512. The band 512 may include a rigid material such as metal. The band 512 is secured to the rod 508 at a first end 514 and is secured to the housing 506 at a second end 516. The second end 516 may be secured to the housing 506 through an intermediary component such as a bolt, rivet, screw, pin and the like. In the illustrated embodiment, the second end 516 is secured to a pin retainer 518 that is, in turn, secured to the housing 506.

Together the retainers 510 and band 512 operate as a lock device in a manner similar to the lock device 208. In a pre-impact mode, the first inflator 502 is deployed and exhaust gas forces the band 512 outward. The band 512 pulls the rod 508 out of one or more retainers 510 and the tether 106 is free to disengage from the rod 508. In an impact mode, only the second inflator 504 deploys which does not force the band 512 to pull the rod 508. Thus, the rod 508 remains engaged to the retainers 510 and the tether 106 remains secured.

Figure 6:
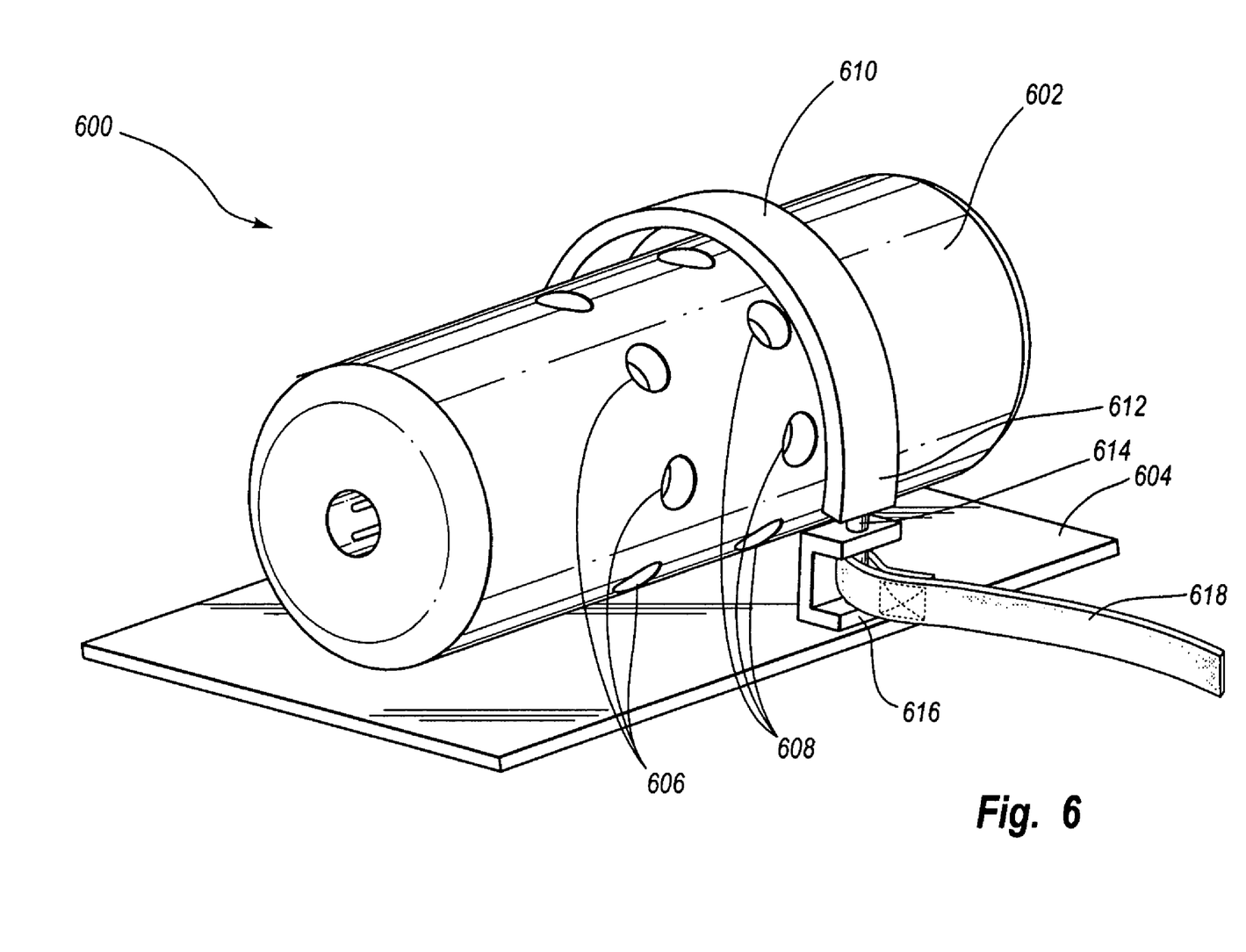
FIG. 6 is a perspective view of an alternative embodiment of an airbag module.

Referring to FIG. 6, an alternative embodiment of a portion of an airbag retention system 600 is shown. The system 600 includes a single inflator 602 that may be embodied in a cylindrical configuration. The inflator 602 may have a longitudinal axis that may be horizontally or vertically oriented relative to a base 604. The base 604 may be included as a portion of a housing (not shown). The inflator 602 is in a fixed position to prevent movement during vehicle movement and during airbag cushion deployment. Retention of the inflator 602 may be accomplished using any number of connectors and fasteners known in the art.

The inflator 602 may be a two-stage deployment inflator with each stage generating first and second amounts of exhaust gas. In this manner, the inflator 602 provides two response levels depending on whether an impact or pre-impact condition exists. The first amount of exhaust gas exits the inflator 602 through first vents 606 that may be disposed in series along the perimeter of the inflator 602. Similarly, the second amount of exhaust gas exits the inflator 602 through second vents 608 that may be disposed in series.

A band 610 is disposed in proximity to the second vents 608 to receive the impact of the second amount of exhaust. The band 610 is removed from the first vents 606 to limit impact of the first amount of exhaust gas. The band 610 is secured at one end (not shown) such as to the base 604. The band 610 may be secured at a second end 612 to a pin 614. The pin 614 may be secured by frictional engagement or press fit to a bracket 616 that is secured to the base 604. A tether 618 is secured to the pin 614 in a manner similar to previous embodiments.

During impact detection, the inflator 602 vents a first amount of exhaust gas through the first vents 606. The band 610 does not receive sufficient force from the gas to remove the pin 614 and the tether 618 remains secured.

During pre-impact detection, the inflator 602 vents a second amount of exhaust gas through the second vents 608. The exhaust gas impacts the band 610 to dislodge the pin 614 from the bracket 616 and the tether 618 is released. After venting the second amount of gas, the inflator 602 vents the first amount of exhaust gas through the first vents 606 to continue to fill an airbag cushion.

A two-stage inflator 602 may also be used with a lock device 208 such as that disclosed in reference to FIGS. 2–4B. The lock device 208 may be disposed in proximity to vents to receive the impact of a single stage deployment. Thus, an airbag restraint system incorporating a two-stage inflator is not limited to the tether release of FIG. 6.

Figure 7:
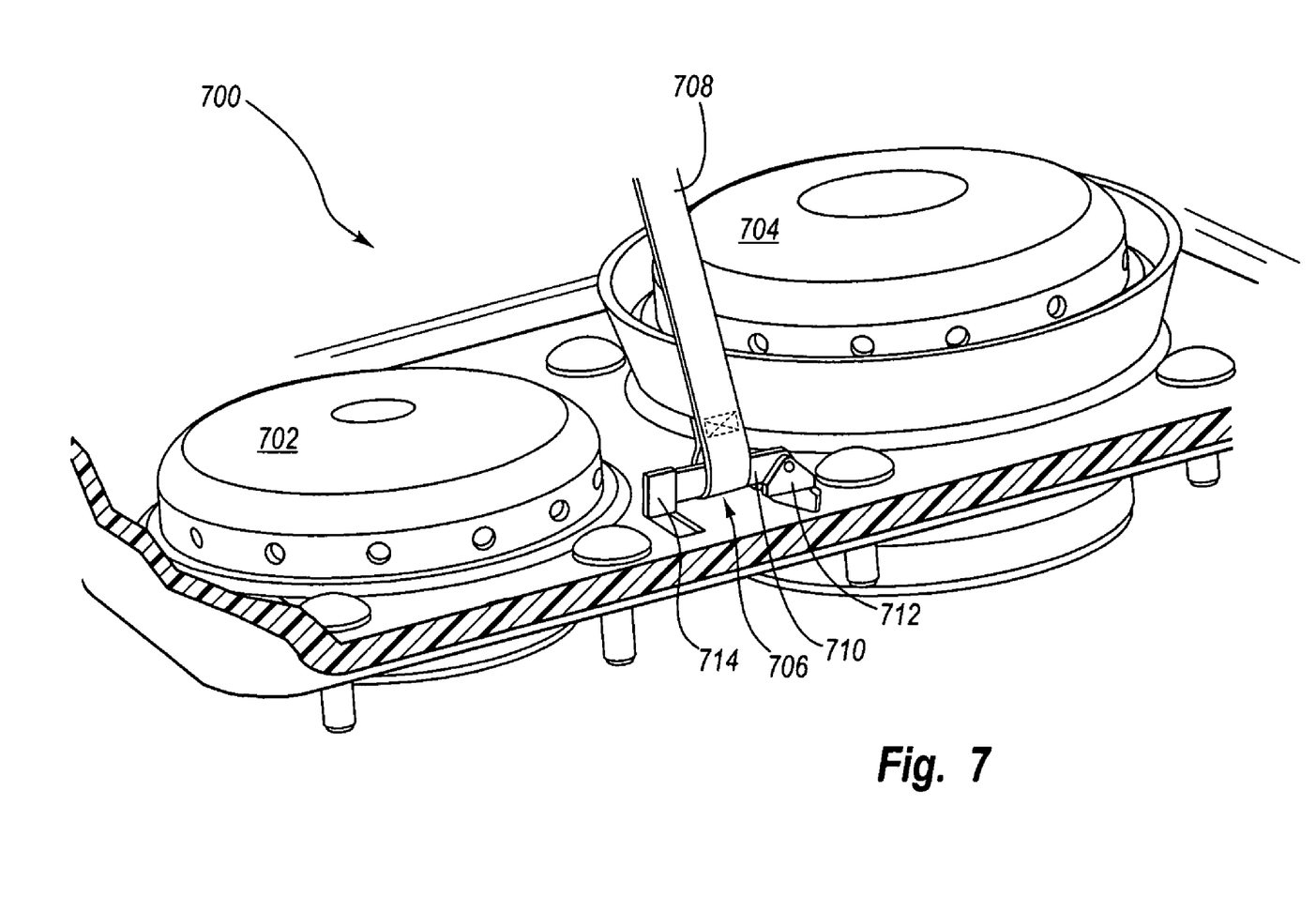
FIG. 7 is a perspective view of an alternative embodiment of an airbag module.

Referring to FIG. 7, an alternative embodiment of a portion of an airbag retention system 700 is shown. The system 700 is similar to those previously described in that the system includes first and second inflators 702, 704. However, the system 700 may also be embodied with a single two-stage inflator as in FIG. 6. The system 700 does not include a tether release mechanism that is operated by exhaust gas. Instead, the system 700 includes a tether release device 706 that is operated by electronic control.

The tether release device 706 is in electrical communication with pre-impact sensors. Upon a determination that a pre-impact condition exists, the tether release device 706 is electronically signaled to operate. The tether release device 706 releases the tether 708 and the inflators 702, 704 sequentially deploy exhaust gas. As can be appreciated, the tether release device 706 may be embodied in numerous ways including electromechanical, electromagnetic, and pyrotechnic components. In one embodiment, the tether release device 706 includes a pin or rod 710 that is pivotally coupled to a mount 712. The pin 710 is further coupled to a lock device 714. The lock device 714 releases its engagement of the pin 710 when electronically signaled. The lock device 714 may include a solenoid actuator, a pyrotechnic, an electromagnetic, or other component to effect disengagement of the pin 710. As the pin 710 is released from the lock device 714, the tether 708 pulls on the pin 710 which causes the pin 710 to pivot. The tether 708 slides off the pin 710 and full deployment of an airbag cushion is enabled.

One of skill in the art will appreciate that a tether release device 706 may be embodied in other ways as well. Rather than enabling pivotal movement of a pin, a tether release device 706 may include an electromagnetic or pyrotechnic device to slide or rupture a pin from a fixed position. Thus, the tether release device 706 may be embodied in a manner similar to that of FIG. 5 wherein a pin is pulled from a retainer. However, the act of disengagement is initiated electronically. Thus, as can be appreciated by one of skill in the art, the invention includes electronic release of the tether that is independent of exhaust gas.

Disclosed herein are novel airbag restraint systems that are capable of deploying in both pre-impact and impact modes. Thus, detection of a pre-impact event allows for early airbag cushion deployment with the advantages of superior occupant protection and less aggressive fill rate. In the event a pre-impact event is missed, the airbag cushion is deployed in an impact mode to still provide occupant protection. The airbag cushions described herein have application to both driver and passenger positions and may further be positioned in side panels. Furthermore, the airbag cushions may be configured in a variety of sizes based on design constraints.

The above description fully discloses the invention including preferred embodiments thereof. Without further elaboration, it is believed that one skilled in the art can use the preceding description to utilize the invention to its fullest extent. It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag restraint system to provide occupant restraint in pre-impact and impact conditions, comprising:
   a housing;
   first and second inflators at least partially disposed within the housing, the first inflator to only deploy in a pre-impact condition and the second inflator to deploy in pre-impact and impact conditions;
   an inflatable airbag cushion; and
   a tether coupled to the interior surface of the airbag cushion at a distal end and releasably secured at a proximal end of the tether such that upon deployment of the first inflator the proximal end of the tether is released and the airbag cushion is allowed to expand to full capacity and upon non-deployment of the first inflator the proximal end of the tether remains secured and the airbag cushion is allowed to expand to limited capacity.

2. The airbag restraint system of claim 1, further comprising a rod disposed within the housing and wherein the proximal end of the tether includes a loop to engage the rod.

3. The airbag restraint system of claim 2, further comprising a lock device disposed within the housing and engaging the rod to retain the rod in a fixed position, wherein the lock device is disposed in proximity to the first inflator such that upon deployment of the first inflator the lock device releases the rod and the proximal end of the tether.

4. The airbag restraint system of claim 3, wherein the lock device comprises:
   a clip member to engage and retain the rod;
   an arm coupled to the clip member; and
   a plate member coupled to the clip member and disposed to receive the impact of exhaust gas from the first inflator and thereby move the lock device and disengage the clip member from the rod.

5. The airbag restraint system of claim 3, wherein the lock device comprises:
   a plurality of retainers coupled to the housing and engaging the rod; and
   a band coupled to the rod and at least partially disposed around the first inflator to receive the impact of exhaust gas and thereby disengage the rod from the retainers.

6. The airbag restraint system of claim 3, further comprising a baffle at least partially disposed around the second inflator and wherein the baffle is disposed to direct exhaust gas away from the lock device.

7. The airbag restraint system of claim 1, further comprising a tether release device coupled to the proximal end of the tether, the tether release device to receive an electrical signal to initiate tether release.

8. The airbag restraint system of claim 7, wherein the tether release device includes a pyrotechnic component.

9. The airbag restraint system of claim 7, wherein the tether release device includes an actuator.

10. An airbag restraint system to provide occupant restraint in pre-impact and impact conditions, comprising:
    a housing;
    first and second inflators at least partially disposed within the housing, the first inflator to only deploy in a pre-impact condition and the second inflator to deploy in pre-impact and impact conditions;
    an inflatable airbag cushion;
    a rod disposed within the housing;
    a tether coupled to the interior surface of the airbag cushion at a distal end and coupled to the rod at a proximal end of the tether; and
    a lock device disposed within the housing and engaging the rod such that upon deployment of the first inflator the lock device enables release of the proximal end of the tether from the rod and the airbag cushion is allowed to expand to full capacity and upon non-deployment of the first inflator the lock device retains the position of the rod and the proximal end of the tether remains secured to the rod and the airbag cushion is allowed to expand to limited capacity.

11. The airbag restraint system of claim 10, wherein the proximal end of the tether includes a loop to engage the rod.

12. The airbag restraint system of claim 10, wherein the lock device is disposed in proximity to the first inflator such that upon deployment of the first inflator the lock device is impacted with exhaust gas.

13. The airbag restraint system of claim 10, wherein the lock device comprises:
    a clip member to engage and retain the rod;
    an arm coupled to the clip member; and
    a plate member coupled to the clip member and disposed to receive the impact of exhaust gas from the first inflator and thereby move the lock device and disengage the clip member from the rod.

14. The airbag restraint system of claim 10, wherein the lock device comprises:
    a plurality of retainers coupled to the housing and engaging the rod; and
    a band coupled to the rod and at least partially disposed around the first inflator to receive the impact of exhaust gas and thereby disengage the rod from the retainers.

15. The airbag restraint system of claim 10, further comprising a baffle at least partially disposed around the second inflator and wherein the baffle is disposed to direct exhaust gas away from the lock device.

16. The airbag restraint system of claim 10, wherein the lock device is adapted to receive an electrical signal indicative of tether release.

17. The airbag restraint system of claim 16, wherein the lock device includes a pyrotechnic component.

18. The airbag restraint system of claim 16, wherein the lock device includes an actuator.

19. An airbag restraint system to provide occupant restraint in pre-impact and impact conditions, comprising:
    a housing;
    an inflatable airbag cushion;
    inflator means for inflating the inflatable airbag cushion and at least partially disposed within the housing, the inflator means adapted to deploy in pre-impact and impact condition conditions;
    a tether having distal and proximal ends and coupled to the interior surface of the airbag cushion at a distal end; and
    securing means disposed within the housing and releasably coupled to the proximal end of the tether such that upon deployment of the inflator means in a pre-impact condition, the proximal end of the tether is released and the airbag cushion is allowed to expand to full capacity and upon deployment of the inflator means in an impact condition, the proximal end of the tether remains secured and the airbag cushion is allowed to expand to limited capacity.

20. The airbag restraint system of claim 19, wherein the securing means comprises a rod disposed within the housing and wherein the proximal end of the tether includes a loop to engage the rod.

21. The airbag restraint system of claim 20, wherein the securing means comprises lock means to engage the rod and retain the rod in a fixed position, wherein the lock means is disposed in proximity to the inflator means such that upon deployment of the inflator means in a pre-impact condition, the lock means releases the rod and the proximal end of the tether.

22. The airbag restraint system of claim 21, wherein the lock means comprises:
    a clip member to engage and retain the rod;
    an arm coupled to the clip member; and
    a plate member coupled to the clip member and disposed to receive the impact of exhaust gas from the inflator means and thereby move the lock means and disengage the clip member from the rod.

23. The airbag restraint system of claim 21, wherein the lock means comprises:
   a plurality of retainers coupled to the housing and engaging the rod; and
   a band coupled to the rod and at least partially disposed around the inflator means to receive the impact of exhaust gas and thereby disengage the rod from the retainers.

24. The airbag restraint system of claim 21, further comprising a baffle at least partially disposed around the inflator means and wherein the baffle is disposed to direct exhaust gas away from the lock means.

25. The airbag restraint system of claim 19, wherein the securing means is adapted to receive an electrical signal indicative of tether release.

26. The airbag restraint system of claim 19, wherein the inflator means includes first and second inflators.

27. The airbag restraint system of claim 19, wherein the inflator means includes a two-stage inflator to vent first and second amounts of exhaust gas.

28. A method for providing airbag restraint for an occupant during either pre-impact and impact conditions, comprising:
   providing an airbag cushion having a tether coupled to the interior surface of the airbag cushion at a distal end and releasably secured at a proximal end;
   upon detecting a pre-impact condition, sequentially deploying first and second inflators;
   upon deploying the first inflator, releasing the proximal end of the tether and allowing the airbag cushion to expand to full capacity; and
   upon detecting an impact condition, deploying only a second inflator and the tether restricting expansion of the airbag cushion to a limited capacity.

29. The method of claim 28, further comprising releasably engaging the proximal end of the tether with a rod.

30. The method of claim 29, wherein releasing the proximal end of the tether includes the first inflator effecting movement of the rod to thereby release the proximal end of the tether.

31. The method of claim 28, wherein releasing the proximal end of the tether includes transmitting an electrical signal indicative of tether release.

32. An airbag restraint system to provide occupant restraint in pre-impact and impact conditions, comprising:
   a housing;
   an inflator at least partially disposed within the housing and to deploy first and second amounts of exhaust gas, the inflator to only deploy the first amount of exhaust gas in a pre-impact condition and to deploy the second amount of exhaust gas in pre-impact and impact conditions;
   an inflatable airbag cushion; and
   a tether coupled to the interior surface of the airbag cushion at a distal end and releasably secured at a proximal end of the tether such that upon deployment of the first amount of exhaust gas the proximal end of the tether is released and the airbag cushion is allowed to expand to full capacity and upon non-deployment of the first amount of exhaust gas the proximal end of the tether remains secured and the airbag cushion is allowed to expand to limited capacity.

33. The airbag restraint system of claim 32, further comprising a rod disposed within the housing and wherein the proximal end of the tether includes a loop to engage the rod.

34. The airbag restraint system of claim 33, further comprising a lock device disposed within the housing and engaging the rod to retain the rod in a fixed position, wherein the lock device is disposed in proximity to the inflator such that upon deployment of the first amount of exhaust gas the lock device releases the rod and the proximal end of the tether.

35. The airbag restraint system of claim 34, wherein the lock device comprises:
   a clip member to engage and retain the rod;
   an arm coupled to the clip member; and
   a plate member coupled to the clip member and disposed to receive the impact of the first amount of the exhaust gas and thereby move the lock device and disengage the clip member from the rod.

36. The airbag restraint system of claim 34, wherein the lock device comprises:
   a plurality of retainers coupled to the housing and engaging the rod; and
   a band coupled to the rod and at least partially disposed around the inflator to receive the impact of the first amount of exhaust gas and thereby disengage the rod from the retainers.

37. The airbag restraint system of claim 32, further comprising a tether release device coupled to the proximal end of the tether, the tether release device to receive an electrical signal to initiate tether release.

38. The airbag restraint system of claim 37, wherein the tether release device includes a pyrotechnic component.

39. The airbag restraint system of claim 37, wherein the tether release device includes an actuator.

40. A method for providing airbag restraint for an occupant during either pre-impact and impact conditions, comprising:
   providing an airbag cushion having a tether coupled to the interior surface of the airbag cushion at a distal end and releasably secured at a proximal end;
   upon detecting a pre-impact condition, an inflator sequentially deploying first and second amounts of exhaust gas;
   upon deploying the first amount of exhaust gas, releasing the proximal end of the tether and allowing the airbag cushion to expand to full capacity; and
   upon detecting an impact condition, deploying only the second amount of exhaust gas and the tether restricting expansion of the airbag cushion to a limited capacity.

41. The method of claim 40, further comprising releasably engaging the proximal end of the tether with a rod.

42. The method of claim 41, wherein releasing the proximal end of the tether includes the first amount of exhaust gas effecting movement of the rod to thereby release the proximal end of the tether.

43. The method of claim 40, wherein releasing the proximal end of the tether includes transmitting an electrical signal indicative of tether release.

* * * * *